(12) United States Patent
Aono et al.

(10) Patent No.: US 10,539,197 B2
(45) Date of Patent: Jan. 21, 2020

(54) CENTRIFUGAL CLUTCH

(71) Applicant: Kabushiki Kaisha F.C.C., Shizuoka (JP)

(72) Inventors: Kaoru Aono, Shizuoka (JP); Yuta Kine, Shizuoka (JP); Yuta Yokomichi, Shizuoka (JP); Makoto Kataoka, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 120 days.

(21) Appl. No.: 15/765,479

(22) PCT Filed: Sep. 2, 2016

(86) PCT No.: PCT/JP2016/075822
§ 371 (c)(1),
(2) Date: Apr. 2, 2018

(87) PCT Pub. No.: WO2017/061198
PCT Pub. Date: Apr. 13, 2017

(65) Prior Publication Data
US 2019/0072140 A1 Mar. 7, 2019

(30) Foreign Application Priority Data
Oct. 8, 2015 (JP) .................. 2015-200018

(51) Int. Cl.
*F16D 43/18* (2006.01)
*F16D 43/14* (2006.01)

(52) U.S. Cl.
CPC ........ *F16D 43/18* (2013.01); *F16D 2043/145* (2013.01)

(58) Field of Classification Search
CPC ........................... F16D 43/18; F16D 2043/145
See application file for complete search history.

(56) References Cited

U.S. PATENT DOCUMENTS

2008/0248919 A1* 10/2008 Asaoka ............ F16H 61/66259
477/39
2011/0240433 A1 10/2011 Fang
2013/0334005 A1 12/2013 Wu

FOREIGN PATENT DOCUMENTS

EP 2375093 A2 10/2011
JP S42015451 Y 9/1967
(Continued)

OTHER PUBLICATIONS

International Search Report dated Dec. 6, 2016 filed in PCT/JP2016/075822.

(Continued)

*Primary Examiner* — Timothy Hannon
(74) *Attorney, Agent, or Firm* — Rankin, Hill & Clark LLP

(57) ABSTRACT

A centrifugal clutch 200 includes a first drive plate 210 rotationally driven directly by a driving force of an engine and a second drive plate 220 frictionally in contact with the first drive plate 210. The first drive plate 210 includes a bulging body 215 on a supporting portion 214 bulging toward the second drive plate 220. The second drive plate 220 is rotationally driven together with the first drive plate 210 while allowing rotational displacement relative to the first drive plate and includes clutch weights 230. The bulging body 215 is made of a cylindrical roller. The clutch weight 230 is formed with a driven portion 232. The driven portion 232 has a pressing body 232a in contact with the bulging body 215. The pressing body 232a obliquely extends rearwardly and outwardly in a rotational drive direction of the first drive plate 210.

4 Claims, 10 Drawing Sheets

(56) References Cited

FOREIGN PATENT DOCUMENTS

| | | |
|---|---|---|
| JP | 2006038124 A | 2/2006 |
| JP | 2012229730 A | 11/2012 |
| JP | 2014145420 A | 8/2014 |
| WO | 2015156130 A1 | 10/2015 |
| WO | 2016199639 A1 | 12/2016 |

OTHER PUBLICATIONS

Decision to Grant a Patent dated Aug. 2, 2017 for the corresponding Japanese Patent Application No. 2015-200018.

* cited by examiner (A)

(B)

(C)

(D)

CENTRIFUGAL CLUTCH

TECHNICAL FIELD

The present invention relates to a centrifugal clutch, which cuts off transmission of a rotational driving force to a driven side until a rotational speed of an engine reaches a predetermined value, and transmits the rotational driving force to the driven side when the rotational speed of the engine reaches the predetermined value.

BACKGROUND ART

Conventionally, the centrifugal clutch is used for a motorcycle, a brush cutter, and the like. The centrifugal clutch transmits the rotational driving force to the driven side when the rotational speed of the engine reaches the predetermined value. For example, in the centrifugal clutch disclosed in Patent Document 1, as the rotational speed of the engine increases, a clutch weight is gradually displaced to a side of a clutch outer and makes frictional contact. Further, in the centrifugal clutch disclosed in Patent Document 2, a columnar roller rides on a cam-shaped protrusion rotationally driven by a driving force of the engine, so that clutch shoes provided on an outer side of the roller press the clutch outer to bring the clutch into a connected state.

CITATION LIST

Patent Literature

Patent Document 1: JP-A-2006-038124
Patent Document 2: JP-UM-B-42-015451

However, in the centrifugal clutch described in the above-described. Patent Document 1, the clutch weight gradually makes frictional contact with the clutch outer as the rotational speed of the engine increases. Therefore, since time until the clutch enters the connected state becomes longer, there is a problem that fuel economy decreases. On the other hand, in the centrifugal clutch described in Patent Document 2, immediately after the cam-shaped protrusion rotates, the roller rides on the cam-shaped protrusion, and the clutch enters the connected state. Therefore, since the driven side suddenly operates, there has been a problem that it is difficult for an operator to handle.

The present invention has been made to address the above problems. An object of the present invention is to provide a centrifugal clutch capable of quickly establishing a connected state while preventing sudden startup on a driven side.

SUMMARY OF THE INVENTION

In order to achieve the above object, the present invention is a centrifugal clutch including a first drive plate rotationally driven together with a driven pulley by receiving a driving force of an engine, a second drive plate disposed outside the first drive plate and contacting the first drive plate with a frictional force capable of being rotationally driven together with the first drive plate while allowing rotational displacement relative to the first drive plate, a clutch weight movably mounted on the second drive plate, displaced outwardly to the second drive plate by a centrifugal force due to rotation drive of the second drive plate, and having a clutch shoe on a surface outside thereof, a clutch outer having a cylindrical surface in frictional contact with the clutch shoe displaced outwardly to the second drive plate, a bulging body formed to bulge outwardly from an outer circumferential portion of the first drive plate, and a pressing body provided on the clutch weight and pressed against the bulging body, wherein at least one of the bulging body and the pressing body is formed to extend rearwardly in a rotational drive direction of the first drive plate and outwardly to the first drive plate.

According to a feature of the present invention configured as described above, in the centrifugal clutch, after the first drive plate starts rotation drive, the clutch shoes contact the clutch outer. Thus, when the second drive plate is displaced rearward in the rotational drive direction with respect to the first drive plate, the pressing body rides on the bulging body. Thus, the clutch shoes rapidly press the clutch outer. That is, time until the clutch shoes contact the clutch outer is secured from when the first drive plate starts rotation drive until when the centrifugal clutch enters the connected state. Further, when the clutch shoes contact the clutch outer, the centrifugal clutch rapidly shifts to the connected state. As a result, the centrifugal clutch can quickly enter the connected state while preventing sudden startup on the driven side.

Further, in the centrifugal clutch according to the present invention, since the pressing body rides on the bulging body, the clutch shoes are strongly pressed against the clutch outer. Therefore, the rotational driving force from the engine can be transmitted with a clutch weight lighter than a conventional centrifugal clutch even when the rotational speed is the same as that of the conventional centrifugal clutch. That is, according to the centrifugal clutch of the present invention, it is possible to reduce weight of the clutch weight. Therefore, it is possible to prevent occurrence of judder at the time of connecting the clutch. Further, it is possible to realize simplification, compactification and cost reduction of a structure of the centrifugal clutch. This means that when the weight of the clutch weight is the same as the conventional centrifugal clutch, it is possible to increase the driving force which can be transmitted by the centrifugal clutch. In the centrifugal clutch according to the present invention, it is also possible to appropriately adjust the time until the clutch enters the connected state by adjusting magnitude of the frictional force at the contact surface between the first drive plate and the second drive plate.

Another feature of the present invention resides in that, in the centrifugal clutch, the pressing body is constituted by a flat surface, and the bulging body is constituted by a curved surface partially contacting the pressing body.

According to another feature of the present invention configured as described above, in the centrifugal clutch, the bulging body is formed in a curved surface shape, and the pressing body is formed in a flat shape. Therefore, as compared with a case where both the bulging body and the pressing body make surface contact, frictional resistance is more suppressed, and the clutch weight is more easily rotationally displaced. Further, as compared with a case where the pressing body is formed in a curved surface shape, it is easier to form the bulging body and the pressing body.

Further, another feature of the present invention resides in that, in the centrifugal clutch, the bulging body is made of a roller rotatably provided rearward in the rotational drive direction of the first drive plate.

According to another feature of the present invention configured as described above, in the centrifugal clutch, the bulging body is made of the roller rotatably provided rearward in the rotational drive direction of the first drive plate. Therefore, by rotation of the bulging body against which the pressing body is pressed, it is possible to prevent increase in frictional resistance and damage due to wear due to friction sliding between the bulging body and the pressing body.

Further, another feature of the present invention resides in that, in the centrifugal clutch, at least one of an outer circumferential portion and an inner circumferential portion of the second drive plate has a bent portion bent with respect to a plate surface.

According to another feature of the present invention configured as described above, in the centrifugal clutch, at least one of the outer circumferential portion and the inner circumferential portion of the second drive plate has the bent portion bent with respect to the plate surface. Therefore, it is possible to increase rigidity of the second drive plate, which supports the clutch weight and transmits the driving force.

Further, another feature of the present invention resides in that, in the centrifugal clutch, the pressing body is made of a material more easily worn than the bulging body. In this case, the pressing body can be made of, for example, a material having lower hardness than the bulging body. Specifically, for example, the pressing body can be made of zinc material, and the bulging body can be made of carbon steel, iron based sintered material or the like. Further, for example, the pressing body and the bulging body can be made of the same material, and by applying a surface hardening treatment such as heat treatment or coating to the bulging member, higher wear resistance than the pressing body can be obtained.

According to another feature of the present invention configured as described above, in the centrifugal clutch, the pressing body is made of a material more easily worn than the bulging body. Therefore, the pressing body wears more than the bulging body. In this case, the pressing body is formed in the clutch weight including the clutch shoe. Therefore, the pressing body is renewed by replacing the clutch weight due to wear of the clutch shoe. That is, in the centrifugal clutch, by exchanging the clutch weigh due to wear of the clutch shoe, the pressing body can also be replaced with a new one at the same time, so that maintenance burden can be reduced.

Further, another feature of the present invention resides in that, in the centrifugal clutch, at least one of two contact surfaces where the first drive plate and the second drive plate are in contact with each other is subjected to surface treatment to maintain slidability. In this case, various coating processes which can improve the wear resistance can be employed as the surface treatment, in addition to the heat treatment such as nitriding treatment and carburizing treatment.

According to another feature of the present invention configured as described above, in the centrifugal clutch, at least one of two contact surfaces where the first drive plate and the second drive plate are in contact with each other is subjected to surface treatment to maintain slidability. Therefore, it is possible to improve durability so that the maintenance burden can be reduced.

BRIEF DESCRIPTION OF THE DRAWINGS

FIGS. 3(A) and 3(B) show appearance configurations of a first drive plate and a second drive plate in the centrifugal clutches shown in FIGS. 1 and 2, wherein FIG. 3(A) is a perspective view showing a state before assembling the first drive plate and the second drive plate, and FIG. 3(B) is a perspective view showing a state where the first drive plate and the second drive plate are assembled;

FIGS. 4(A) to 4(D) show appearance configuration of the bulging body in the centrifugal clutch shown in FIG. 1 and FIG. 2 and an assembled state of the bulging body on the first drive plate, wherein FIG. 4(A) is a perspective view showing a state before assembling the bulging body from outside the first drive plate, FIG. 4(B) is a perspective view showing the state before assembling the bulging body from inside the first drive plate, FIG. 4(C) is a perspective view showing a state where the bulging body is assembled from outside the first drive plate, and FIG. 4(D) is a perspective view showing the state where the bulging body is assembled from inside the first drive plate;

FIGS. 11(A) to 11(D) show appearance configuration of the bulging body in the centrifugal clutch shown in FIG. 10 and an assembled state of the bulging body on the first drive plate, wherein FIG. 11(A) is a perspective view showing a state before assembling the bulging body from outside the first drive plate, FIG. 11(B) is a perspective view showing the state before assembling the bulging body from inside the first drive plate, FIG. 11(C) is a perspective view showing a state where the bulging body is assembled from outside the first drive plate, and FIG. 11(D) is a perspective view showing the state where the bulging body is assembled from inside the first drive plate;

DESCRIPTION OF EMBODIMENTS

Figure 1:
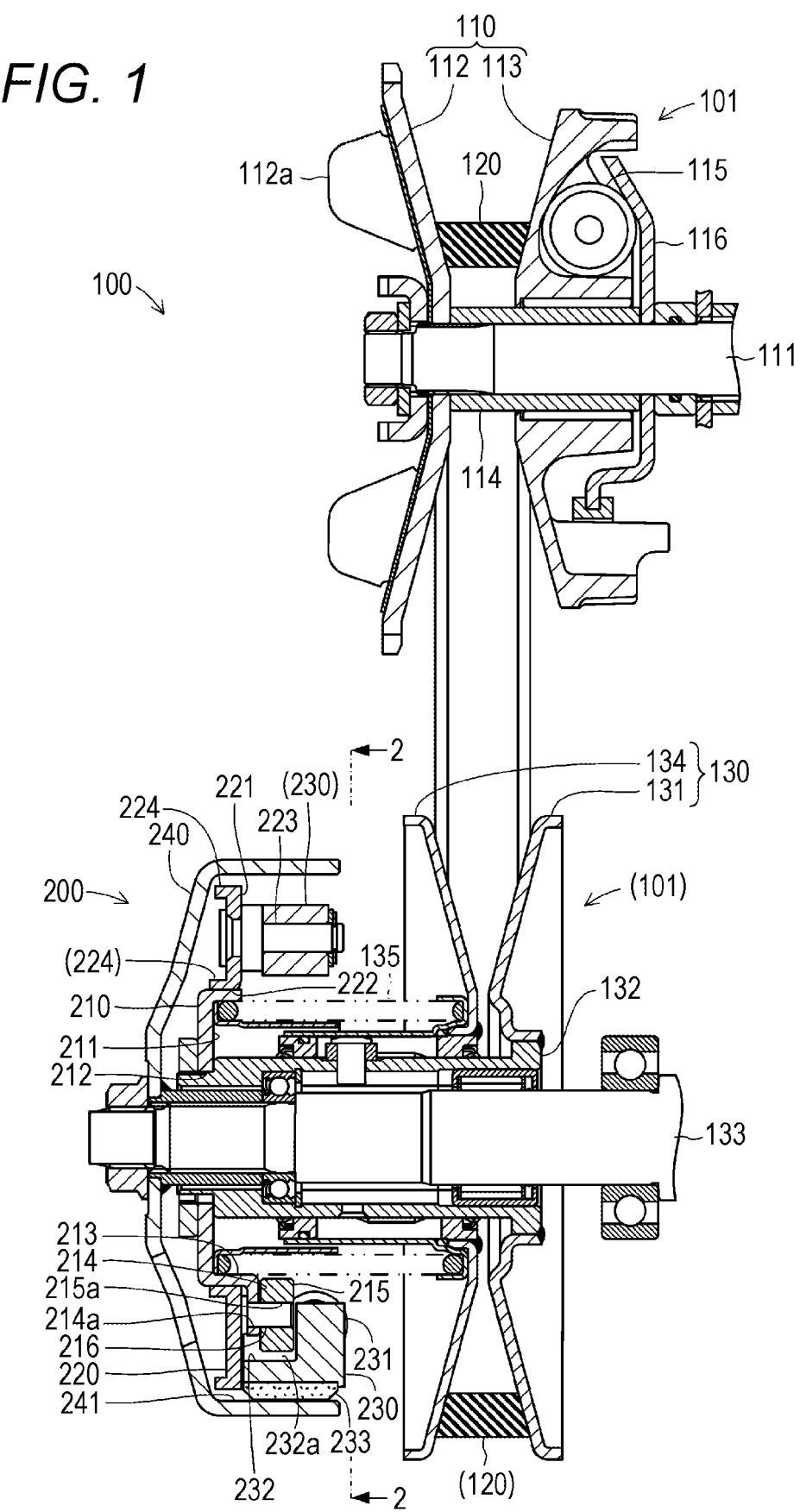
FIG. 1 is a plan sectional view schematically showing a configuration of a power transmission mechanism including a centrifugal clutch according to the present invention.
Figure 2:
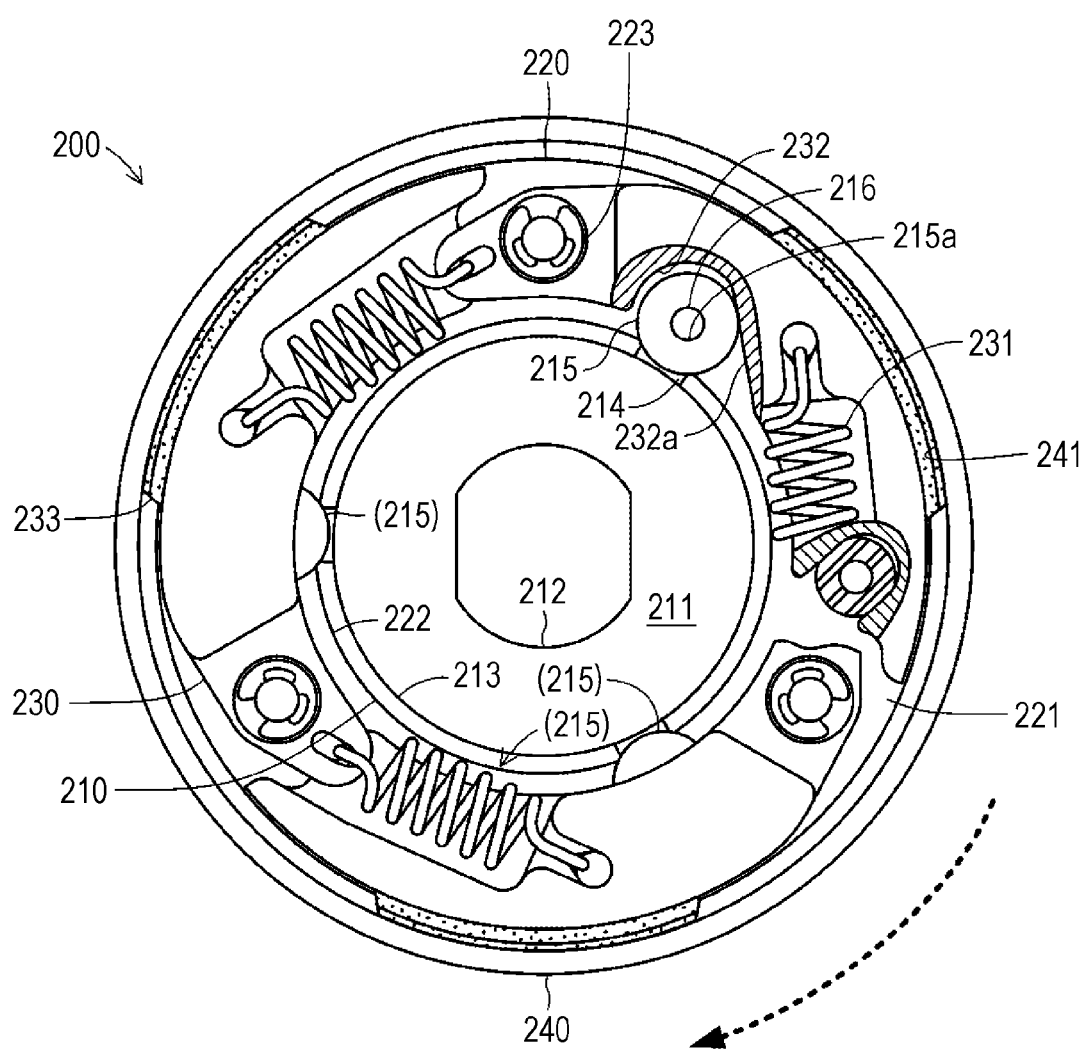
FIG. 2 is a side view of the centrifugal clutch taken along a line 2-2 shown in FIG. 1.

An embodiment of a centrifugal clutch according to the present invention will be described with reference to the drawings below. FIG. 1 is a plan sectional view schematically showing a configuration of a power transmission mechanism 100 including a centrifugal clutch 200 according to the present invention. FIG. 2 is a side view of the centrifugal clutch 200 taken along a line 2-2 shown in FIG. 1. The power transmission mechanism 100 including the centrifugal clutch 200 is a mechanical device provided between an engine and a rear wheel which is a driving wheel, mainly in a motorcycle vehicle such as a scooter, and transmits or cuts off a rotational driving force to the rear wheel while automatically changing a reduction ratio with respect to the number of revolutions of the engine.

(Configuration of Centrifugal Clutch 200)

The power transmission mechanism 100 mainly includes a transmission 101 and the centrifugal clutch 200. The transmission 101 is a mechanical device which decelerates the rotational driving force from the engine (not shown) in a stepless manner and transmits it to the centrifugal clutch 200. The transmission 101 mainly includes a drive pulley 110, a V-belt 120, and a driven pulley 130. Among these, the drive pulley 110 is provided on a crankshaft 111 extending from the engine and is a mechanical device directly driven to rotate by the rotational driving force of the engine. The drive pulley 110 mainly includes a fixed drive plate 112 and a movable drive plate 113.

The fixed drive plate 112 is a component which is rotationally driven together with the movable drive plate 113 while holding the V-belt 120 therebetween. The fixed drive plate 112 is configured by forming a metal material into a conical cylindrical shape. The fixed drive plate 112 is fixedly mounted on the crankshaft 111 in a state where a convex side surface thereof faces toward the movable drive plate 113 (engine). That is, the fixed drive plate 112 is always rotationally driven together with the crankshaft 111. Further, a plurality of radiating fins 112a are radially provided on a concave side surface of the fixed drive plate 112.

The movable drive plate 113 is a component which is rotationally driven together with the fixed drive plate 112 while holding the V-belt 120 therebetween. The movable drive plate 113 is configured by forming a metal material into a conical cylindrical shape. The movable drive plate 113 is mounted on the crankshaft 111 in a direction where a convex side surface thereof faces the fixed drive plate 112. In this case, the movable drive plate 113 is mounted on a sleeve bearing 114 fixedly fitted into the crankshaft 111 via an impregnated bush. The movable drive plate 113 is slidably mounted on the sleeve bearing 114 in an axial direction and a circumferential direction thereof.

On the other hand, a plurality of roller weights 115 are provided in a state pressed by a ramp plate 116 on a concave side surface of the movable drive plate 113. The roller weight 115 is a component for pressing the movable drive plate 113 toward the fixed drive plate 112 in cooperation with the ramp plate 116 by being displaced outwardly in a radial direction in accordance with increase in rotational speed of the movable drive plate 113. The roller weight 115 is configured by forming a metal material into a cylindrical shape. Further, the ramp plate 116 is a component for pressing the roller weight 115 toward the movable drive plate 113. The ramp plate 116 is formed by bending a metal plate toward the movable drive plate 113.

The V-belt 120 is a component for transmitting the rotational driving force of the drive pulley 110 to the driven pulley 130. The V-belt 120 is formed in an endless ring shape made of a core wire covered with a resin material. The V-belt 120 is disposed between the fixed drive plate 112 and the movable drive plate 113 and between a fixed driven plate 131 and a movable driven plate 134 in the driven pulley 130, and is bridged between the drive pulley 110 and the driven pulley 130.

The driven pulley 130 is a mechanical device rotationally driven by the rotational driving force from the engine, which is transmitted via the drive pulley 110 and the V-belt 120. The driven pulley 130 mainly includes the fixed driven plate 131 and the movable driven plate 134.

The fixed driven plate 131 is a component which is rotationally driven together with the movable driven plate 134 while holding the V-belt 120 therebetween. The fixed driven plate 131 is configured by forming a metal material into a conical cylindrical shape. The fixed driven plate 131 is fixedly mounted on a driven sleeve 132 in a state where a convex side surface thereof faces toward the movable driven plate 134.

The driven sleeve 132 is a metallic cylindrical component which is rotationally driven together with the fixed driven plate 131. The driven sleeve 132 is mounted on a drive shaft 133 to be relatively rotatable via a bearing. The drive shaft 133 is a metal rotary shaft body for driving the rear wheel of the motorcycle vehicle on which the power transmission mechanism 100 is mounted via a transmission (not shown). In this case, the rear wheel of the motorcycle vehicle is mounted on one end (right end in the drawing) of the drive shaft 133.

The movable driven plate 134 is a component which is rotationally driven together with the fixed driven plate 131 while holding the V-belt 120 therebetween. The movable driven plate 134 is configured by forming a metal material into a conical cylindrical shape. The movable driven plate 134 is fitted into the driven sleeve 132 to be axially slidable in a direction where a convex side surface thereof faces the fixed driven plate 131.

On the other hand, on a concave side surface of the movable driven plate 134, a torque spring 135 is provided between the concave side surface and a first drive plate 210 of the centrifugal clutch 200. The torque spring 135 is a coil spring which elastically presses the movable driven plate 134 toward the fixed driven plate 131. That is, the transmission 101 shifts a rotational speed of the engine steplessly using a magnitude relation between a diameter sandwiching the V-belt 120 defined by a distance between the fixed drive plate 112 and the movable drive plate 113, and a diameter sandwiching the V-belt 120 defined by a distance between the fixed driven plate 131 and the movable driven plate 134. The centrifugal clutch 200 is provided on a distal end side of the driven sleeve 132 and on a distal end side of the drive shaft 133.

The centrifugal clutch 200 is a mechanical device which transmits or cuts off the rotational driving force of the engine, which is transmitted via the transmission 101, to the drive shaft 133. The centrifugal clutch 200 mainly includes the first drive plate 210, a second drive plate 220, clutch weights 230, and a clutch outer 240.

Figure 3:
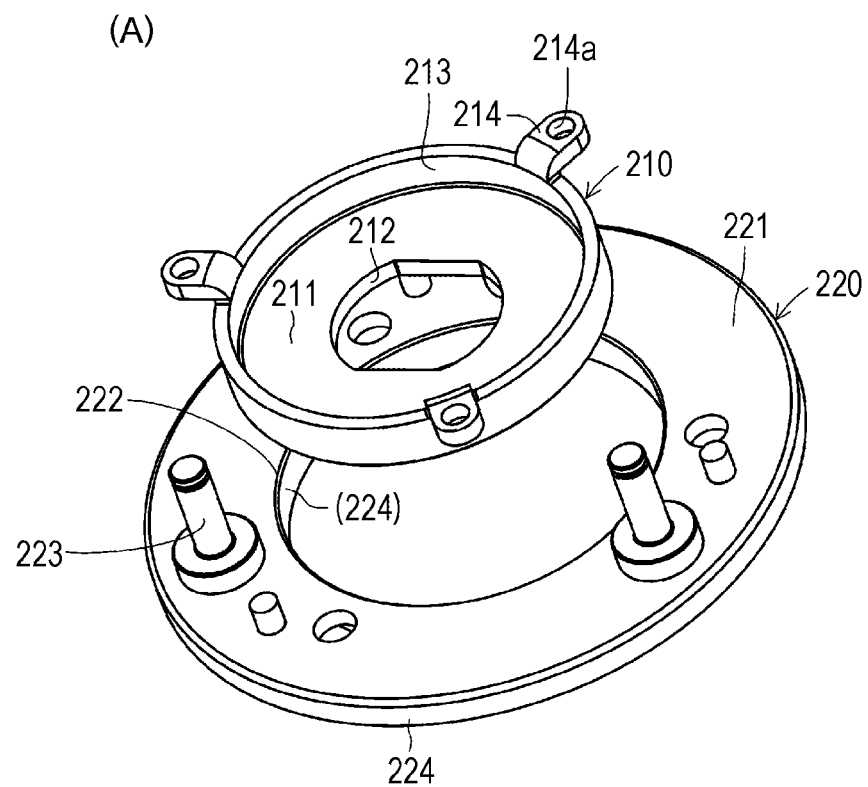
Figure 3:
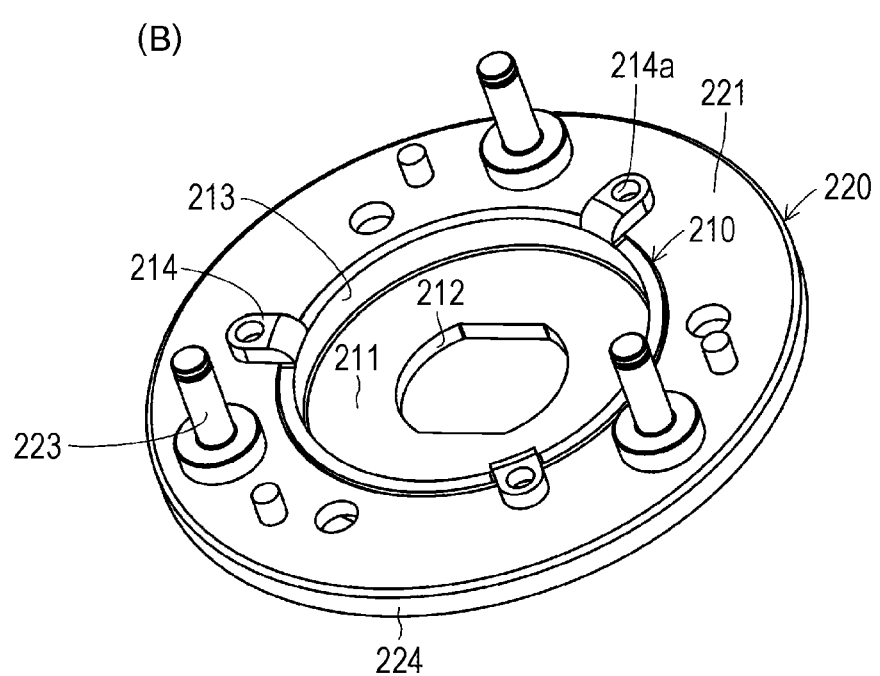
Figure 4:
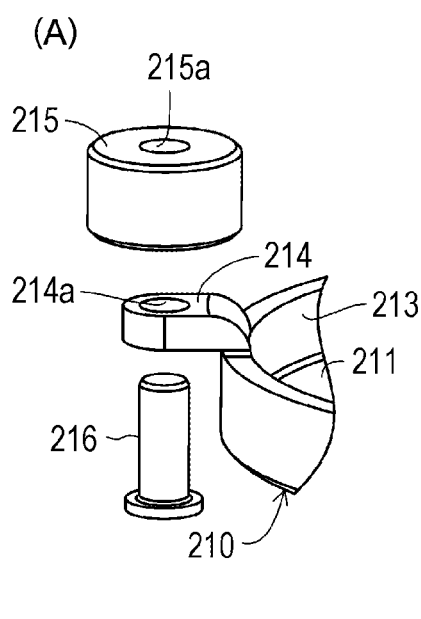
Figure 4:
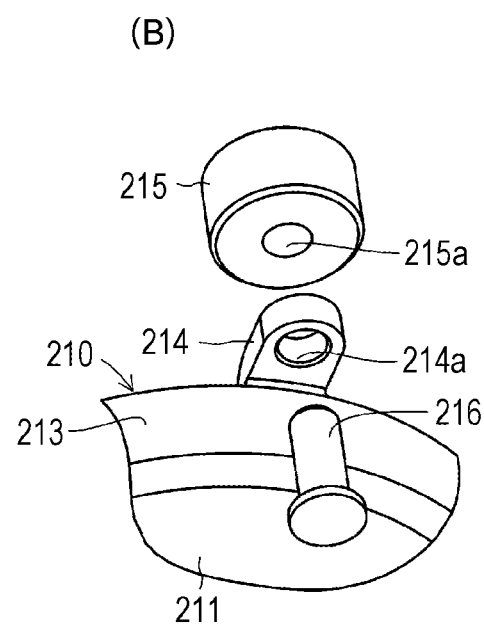
Figure 4:
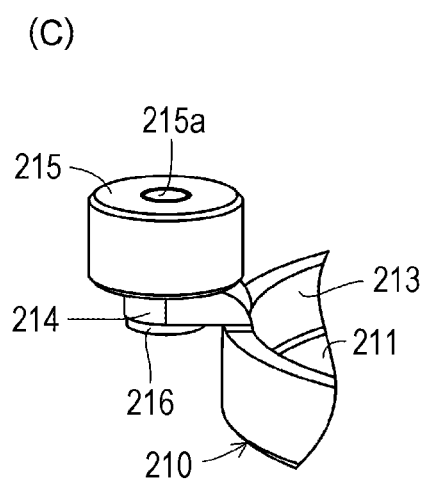
Figure 4:
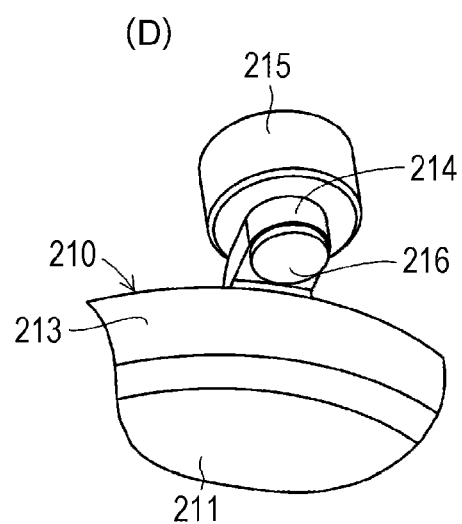

The first drive plate 210 is a component rotationally driven together with the driven sleeve 132, and is configured by forming a metal material into a bottomed cylindrical shape. More specifically, as shown in FIGS. 3(A) and 3(B), in the first drive plate 210, a through-hole 212 through which the driven sleeve 132 passes is formed in a central portion of a flat bottom portion 211. Further, three supporting portions 214 are provided at equal intervals in a circumferential direction at a distal end of a cylinder portion 213 erected around the bottom portion 211.

The supporting portion 214 is a portion hooked on an inner circumferential portion of the second drive plate 220 and is a portion for supporting a bulging body 215. The supporting portion 214 is formed so as to bulge radially outward from the distal end of the cylinder portion 213. A through-hole 214a is formed in the supporting portion 214. A holding pin 216 passing through the bulging body 215 is fitted into the through-hole 214a.

The bulging body 215 is a component for pressing the clutch weight 230 described later toward the clutch outer 240. The bulging body 215 is configured by forming a metal material (for example, carbon steel and iron based sintered material) into a cylindrical shape. More specifically, as shown in FIGS. 4(A) to 4(D), in the bulging body 215, a through-hole 215a thereof through which the holding pin 216 passes is formed in a central portion of a columnar body. In this case, the through-hole 215a is formed to have an inner diameter rotatable and slidable with respect to the holding pin 216, that is, a dimensional tolerance which is a so-called clearance fit with respect to the holding pin 216.

The holding pin 216 is a rod-shaped member for mounting the bulging body 215 on the supporting portion 214 in a rotatable state. The holding pin 216 is formed in such a shape that a distal end portion of a metal rod body thereof projects like a flange. In this case, the holding pin 216 is formed to have an outer diameter rotatable and slidable with respect to the through-hole 214a, that is, a dimension tolerance which is the so-called clearance fit with respect to the through-hole 214a. In FIG. 3(B), illustration of the bulging body 215 and the holding pin 216 is omitted.

In the first drive plate 210, the cylinder portion 213 is fitted into a through-hole 222 of the second drive plate 220 illustration of. The second drive plate 220 is a component which is rotationally driven together with the first drive plate 210 while allowing relative rotational displacement. The second drive plate 220 is configured by forming a metal material into a flat ring shape. More specifically, in the second drive plate 220, the through-hole 222 into which the cylinder portion 213 of the first drive plate 210 is slidably fitted is formed in a central portion of a plate-like ring plate 221. Further, three fulcrum pins 223 are provided in an upright state at equal intervals in a circumferential direction on the ring plate 221. The fulcrum pin 223 is a component for rotatably supporting the clutch weight 230, and is made of a metal rod. Further, a bent portion 224 bent at a right angle to a plate surface of the ring plate 221 is formed in each of the inner circumferential portion and an outer circumferential portion of the second drive plate 220.

The clutch weight 230 is a component for transmitting or cutting off the rotational driving force from the engine to the drive shaft 133 by contacting or separating from the clutch outer 240 via a clutch shoe 233 according to the rotational speed of the second drive plate 220. The clutch weight 230 is configured by forming a metal material (for example, zinc material) in a curved shape extending in a circumferential direction of the second drive plate 220. One end of the clutch weight 230 is rotatably supported by the fulcrum pin 223. In this state, the clutch weights 230 are pulled such that the mutually adjacent clutch weights 230 in the three clutch weights 230 are connected to each other by a connecting spring 231 and are rotated inward of the second drive plate 220. In FIG. 2, for easy understanding of configuration of the clutch weights 230, a part of the two clutch weights 230 out of the three clutch weights 230 is shown broken in different thickness direction faces.

Each driven portion 232 recessed concavely is formed in a portion facing the bulging body 215 of the first drive plate 210 on an inner circumferential surface of each clutch weight 230, more specifically, on a back surface of a lower surface (back side surface in the drawing) of the connecting spring 231. The driven portion 232 is a portion for cooperating with the bulging body 215 to displace the clutch weight 230 toward the clutch outer 240. The driven portion 232 is configured to have a pressing body 232a which is a flat inclined surface. More specifically, the pressing body 232a is formed to obliquely extend rearwardly and outwardly in a rotational drive direction of the first drive plate 210.

In this driven portion 232, thickness of the pressing body 232a is formed thicker than thickness of the bulging body 215. Further, the pressing body 232a is in contact with an outer circumferential surface of the bulging body 215. Further, in the driven portion 232, the pressing body 232a is made of a material which is more easily worn than the bulging body 215. In the present embodiment, the driven portion 232 is made of the same metal material (for example, zinc material) as the clutch weight 230. Further in the driven portion 232, a portion which is deeper than the pressing body 232a is cut out in an arc shape. Thus, a space for rotation of the bulging body 215 is secured.

On the other hand, the clutch shoes 233 are respectively provided on outer circumferential surfaces of the clutch weights 230. The clutch shoe 233 is a component for increasing frictional force against an inner circumferential surface of the clutch outer 240, and is configured by forming friction material in a plate shape extending in an arc shape.

The clutch outer 240 is a component which is rotationally driven together with the drive shaft 133. The clutch outer 240 is configured by forming a metal material into a cup shape covering the outer circumferential surface of the clutch weight 230 from the first drive plate 210. That is, the clutch outer 240 is configured to have a cylindrical surface 241 which frictionally contacts the clutch shoe 233 of the clutch weight 230, which is displaced toward an outer circumference of the second drive plate 220.

(Operation of Centrifugal Clutch 200)

Figure 5:
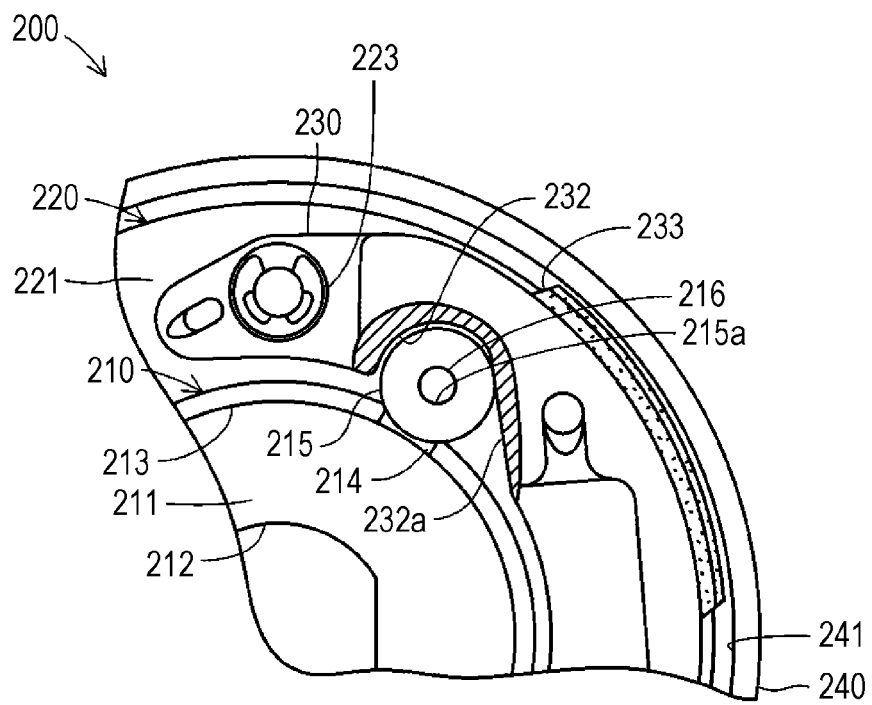
FIG. 5 is a partially enlarged view showing the bulging body and the pressing body in the centrifugal clutch shown in FIG. 2 in a state where the clutch shoes are not in contact with the clutch outer.

Next, an operation of the centrifugal clutch 200 configured as described above will be described. The centrifugal clutch 200 constitutes a part of the power transmission mechanism 100 disposed between the engine and the rear wheel as the driving wheel in the motorcycle vehicle (for example, a scooter) and functions as the part of the power transmission mechanism 100. First, as shown in FIG. 5, when the engine is in an idling state, the centrifugal clutch 200 cuts off transmission of the driving force between the engine and the drive shaft 133. Specifically, in the centrifugal clutch 200, the first drive plate 210 and the second drive plate 220 pressed to the first drive plate 210 via the bulging body 215 and the pressing body 232a are rotationally driven together due to the rotational driving force of the engine transmitted via the transmission 101, and further the clutch weight 230 is rotationally driven. In FIG. 5, the connecting spring 231 is omitted in order to clarify a contact state between the bulging body 215 and the driven portion 232.

However, in this case, in the centrifugal clutch 200, since a centrifugal force acting on the clutch weight 230 is smaller than elastic force (tensile force) of the connecting spring 231, the clutch shoe 233 does not contact the cylindrical surface 241 of the clutch outer 240, so that the rotational driving force of the engine is not transmitted to the drive shaft 133. In this case, the bulging body 215 and the driven portion 232 maintain a state where the pressing body 232*a* is pressed to contact a roller surface of the bulging body 215 by the elastic force (tensile force) of the connecting spring 231.

Figure 6:
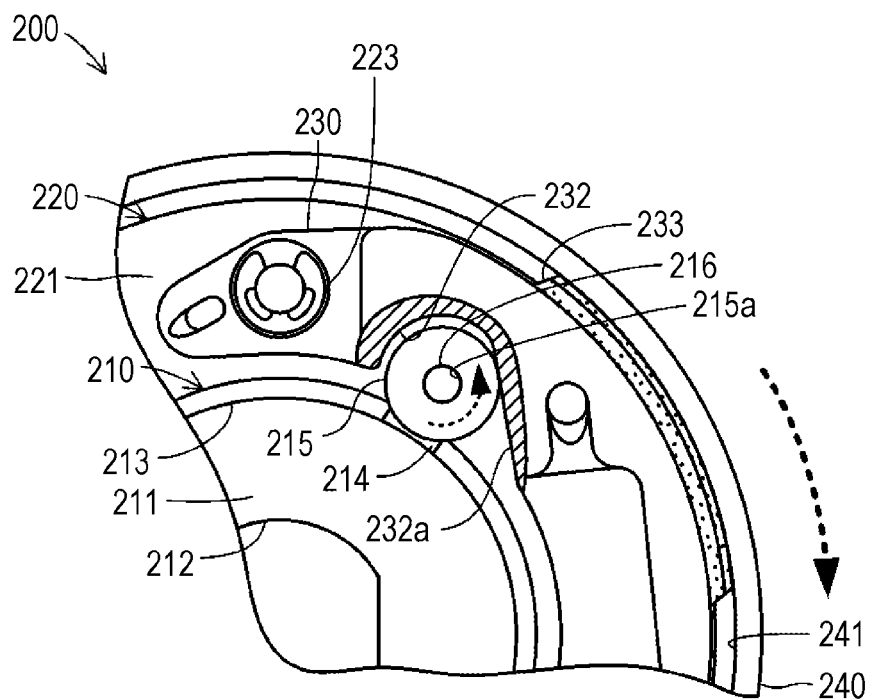
FIG. 6 is a partially enlarged view showing a contact state between the bulging body and the pressing body in a connected state in contact with the clutch outer in a state where the clutch shoe in the centrifugal clutch shown in FIG. 5 is not worn, and showing a state where the bulging body pushes up the pressing body.

On the other hand, the centrifugal clutch 200 transmits the rotational driving force of the engine to the drive shaft 133 in accordance with increase in the rotational speed of the engine by a driver's accelerator operation in the motorcycle vehicle. Specifically, as shown in FIG. 6, in the centrifugal clutch 200, as the rotational speed of the engine increases, the centrifugal force acting on the clutch weight 230 is greater than the elastic force (tensile force) of the connecting spring 231. Thus, the clutch weight 230 rotates around the fulcrum pin 223 and is displaced radially outwardly. That is, in the centrifugal clutch 200, as the rotational speed of the engine increases, the clutch weight 230 is rotationally displaced toward the cylindrical surface 241 of the clutch outer 240 while resisting the elastic force (tensile force) of the connecting spring 231. As a result, the clutch shoe 233 contacts the cylindrical surface 241. In FIG. 6, the connecting spring 231 is omitted in order to clarify the contact state between the bulging body 215 and the driven portion 232. Further, in FIGS. 2 and 6, the rotational drive direction of the first drive plate 210, the second drive plate 220, the clutch outer 240, and the bulging body 215 in the centrifugal clutch 200 is indicated by a dashed arrow.

When the clutch shoe 233 contacts the cylindrical surface 241, the clutch weight 230 receives a reaction force in a direction opposite to the rotational drive direction via the clutch shoe 233. Therefore, the second drive plate 220 is relatively displaced in a direction opposite to the rotational drive direction of the first drive plate 210 by the reaction force received by the clutch weight 230. Thus, the clutch weight 230 supported by the second drive plate 220 is relatively displaced in the direction opposite to the rotational drive direction of the first drive plate 210. Therefore, the pressing body 232*a* of the driven portion 232 is pressed against the bulging body 215.

In this case, since the bulging body 215 is rotatably supported with respect to the supporting portion 214 of the first drive plate 210 and the holding pin 216, it rotates in a counterclockwise direction as shown by pressing by the pressing body 232*a*. Thus, in the clutch weight 230, the pressing body 232*a* is pressed toward the clutch outer 240 on a radially outer side according to rotational displacement of the bulging body 215. Further, the clutch shoe 233 is pressed against the cylindrical surface 241. As a result, after the clutch shoe 233 contacts the cylindrical surface 241 of the clutch outer 240, the clutch shoe 233 is pressed against the cylindrical surface 241 in an extremely short time (in other words, instantaneously). Thus, the centrifugal clutch 200 enters a connected state where the rotational driving force of the engine is completely transmitted to the drive shaft 133.

In the centrifugal clutch 200 in the connected state, since a state where the pressing body 232*a* of the driven portion 232 is pressed against the bulging body 215 is maintained, the first drive plate 210 and the second drive plate 220 are rotationally driven together. Further, since a state where the clutch shoe 233 is pressed against the cylindrical surface 241 of the clutch outer 240 is maintained, the second drive plate 220 and the clutch outer 240 are rotationally driven together. Thus, the motorcycle vehicle can run since the rear wheel is rotationally driven by the rotational driving force of the engine. In this case, although the second drive plate 220 is formed in a ring shape, the second drive plate 220 has high rigidity due to the bent portions 224 formed on the inner circumferential portion and the outer circumferential portion, so that the rotational driving force can be accurately transmitted.

On the other hand, when the rotational speed of the engine decreases, the centrifugal clutch 200 cuts off transmission of the rotational driving force of the engine to the drive shaft 133. Specifically, in centrifugal clutch 200, the centrifugal force acting on the clutch weight 230 is smaller than the elastic force (tensile force) of connecting spring 231 as the engine speed decreases. Thus, the clutch weight 230 is rotationally displaced radially inwardly around the fulcrum pin 223.

Figure 7:
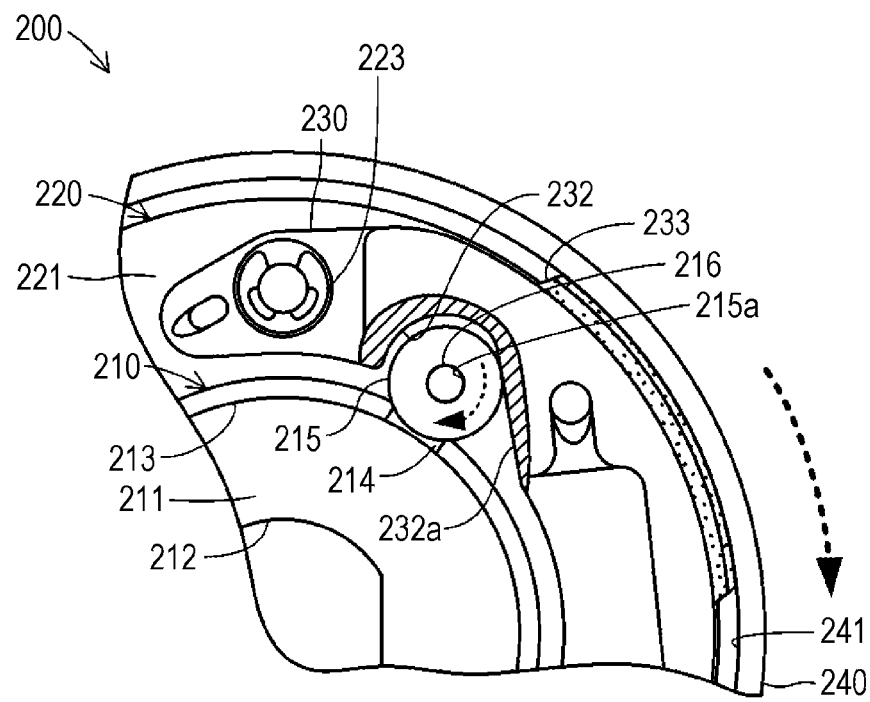
FIG. 7 is a partially enlarged view showing a state where a pushed-up state of the pressing body by the bulging body in the centrifugal clutch shown in FIG. 6 is canceled.

In this case, as shown in FIG. 7, the bulging body 215 against which the pressing body 232*a* is pressed is rotationally displaced clockwise in the drawing due to the elastic force (tensile force) of the connecting spring 231. Therefore, the second drive plate 220 is rotationally displaced forward in a rotation direction of the first drive plate 210 relatively with respect to the first drive plate 210. Thus, the second drive plate 220 returns to an original position (a position in the idling state) with respect to the first drive plate 210. That is, the centrifugal clutch 200 enters a disconnected state, where the clutch shoes 233 are not in contact with the clutch outer 240 and the rotational driving force is not transmitted. In FIG. 7, the connecting spring 231 is omitted in order to clarify the contact state between the bulging body 215 and the driven portion 232. Further, in FIG. 7, the rotational drive direction of the first drive plate 210, the second drive plate 220, the clutch outer 240 and the bulging body 215 in the centrifugal clutch 200 is indicated by a dashed arrow.

Figure 8:
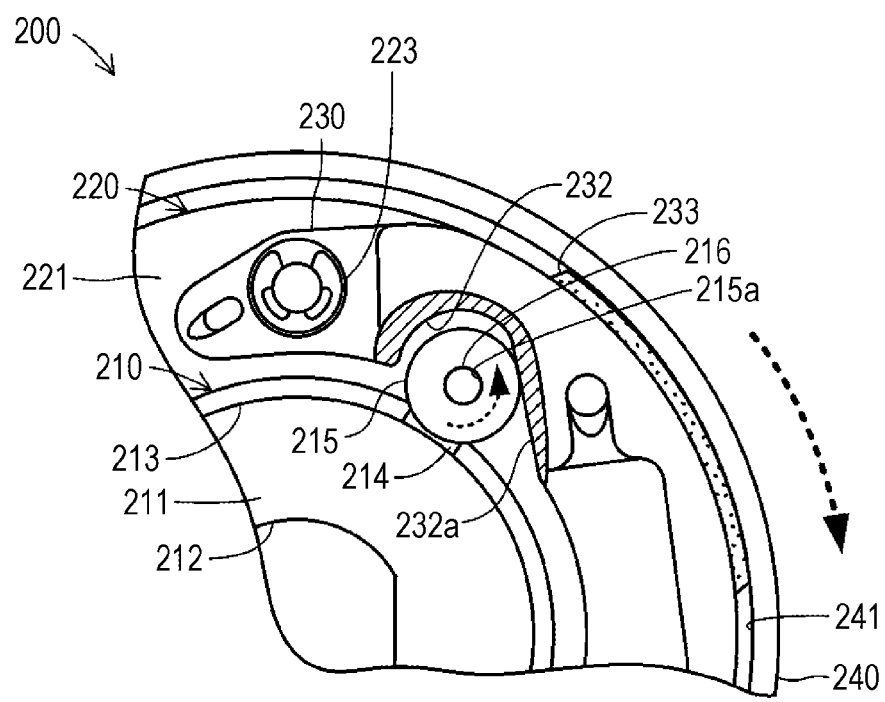
FIG. 8 is a partially enlarged view showing the contact state between the bulging body and the pressing body in the connected state in contact with the clutch outer in a state where the clutch shoe in the centrifugal clutch shown in FIG. 5 is worn by about 1 mm.
Figure 9:
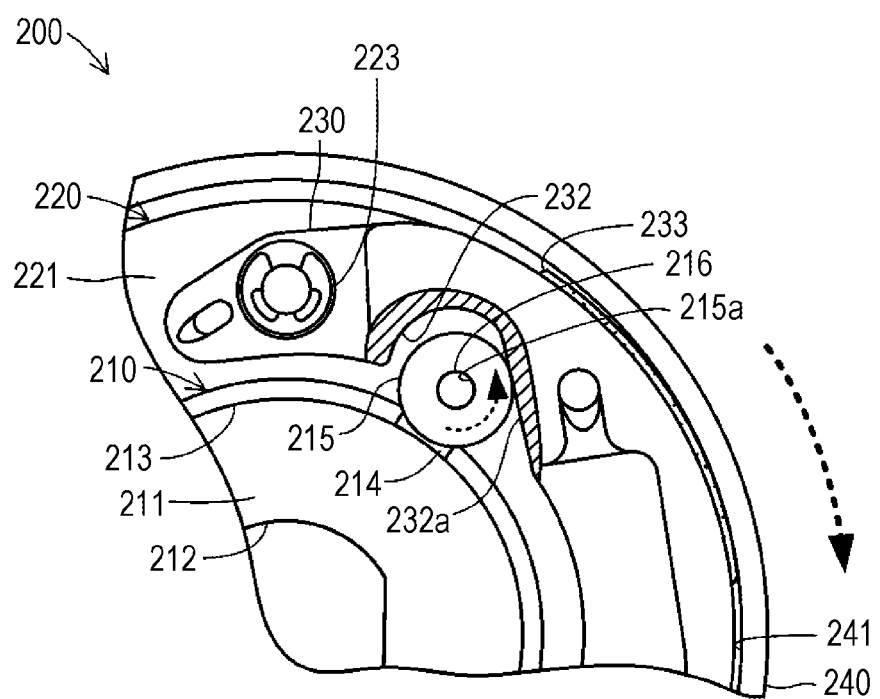
FIG. 9 is a partially enlarged view showing the contact state between the bulging body and the pressing body in the connected state in contact with the clutch outer in a state where the clutch shoe in the centrifugal clutch shown in FIG. 5 is worn by about 2 mm.

Even when thickness of the clutch shoe 233 decreases due to wear, the centrifugal clutch 200 can enter the connected state by quickly pressing the clutch shoe 233 against the cylindrical surface 241 of the clutch outer 240. That is, as shown in FIGS. 8 and 9, in the centrifugal clutch 200, the bulging body 215 is rotatably mounted on the supporting portion 214 and the holding pin 216. Therefore, even when the clutch shoe 233 is worn, an amount of rotational displacement of the bulging body 215 increases by an amount corresponding to this wear amount. Therefore, pressing force of the clutch shoe 233 against the cylindrical surface 241 of the clutch outer 240 is maintained. In FIGS. 8 and 9, the connecting spring 231 is omitted in order to clarify the contact state between the bulging body 215 and the driven portion 232. Further, in FIGS. 8 and 9, the rotational drive direction of the first drive plate 210, the second drive plate 220, the clutch outer 240, and the bulging body 215 in the centrifugal clutch 200 is indicated by a dashed arrow.

As can be understood from the above description of the operation, according to the above embodiment, in the centrifugal clutch 200, after the first drive plate 210 starts rotation drive, the clutch shoes 233 contact the clutch outer 240. Thus, when the second, drive plate 220 is displaced rearward in the rotational drive direction with respect to the first drive plate 210, the driven portion 232 rides on the bulging body 215. Thus, the clutch shoes 233 rapidly press the clutch outer 240. That is, the time until the clutch shoes 233 contact the clutch outer 240 is secured from when the first drive plate 210 starts rotation drive until when the centrifugal clutch 200 enters the connected state. Further, when the clutch shoes 233 contact the clutch outer 240, the centrifugal clutch 200 rapidly enters the connected state. As a result, the centrifugal clutch 200 can quickly enter the connected state while preventing sudden startup on the driven side such as the driving wheel.

Further, embodiments of the present invention are not limited to the above embodiment. The above embodiment can be variously modified without departing from an object of the present invention. In each of the following modifications, the same reference numerals are denoted to the same constituent parts as in the above embodiment, and the description thereof will be omitted.

For example, in the above embodiment, the bulging body 215 is rotatably mounted on the supporting portion 214 of the first drive plate 210. However, the bulging body 215 may be fixedly mounted on the supporting portion 214 of the first drive plate 210, or integrally formed of the same material with the first drive plate 210. When the bulging body 215 is integrally formed of the same material with the first drive plate 210, the bulging body 215 is preferably formed of a curved surface including a circular arc surface of one, two or more curvatures in a range where the pressing body 232a slides. Further, the bulging body 215 and the driven portion 232 respectively provided in the first drive plate 210 and the clutch weight 230 may be provided at least one each, that is, at least one pair.

Figure 10:
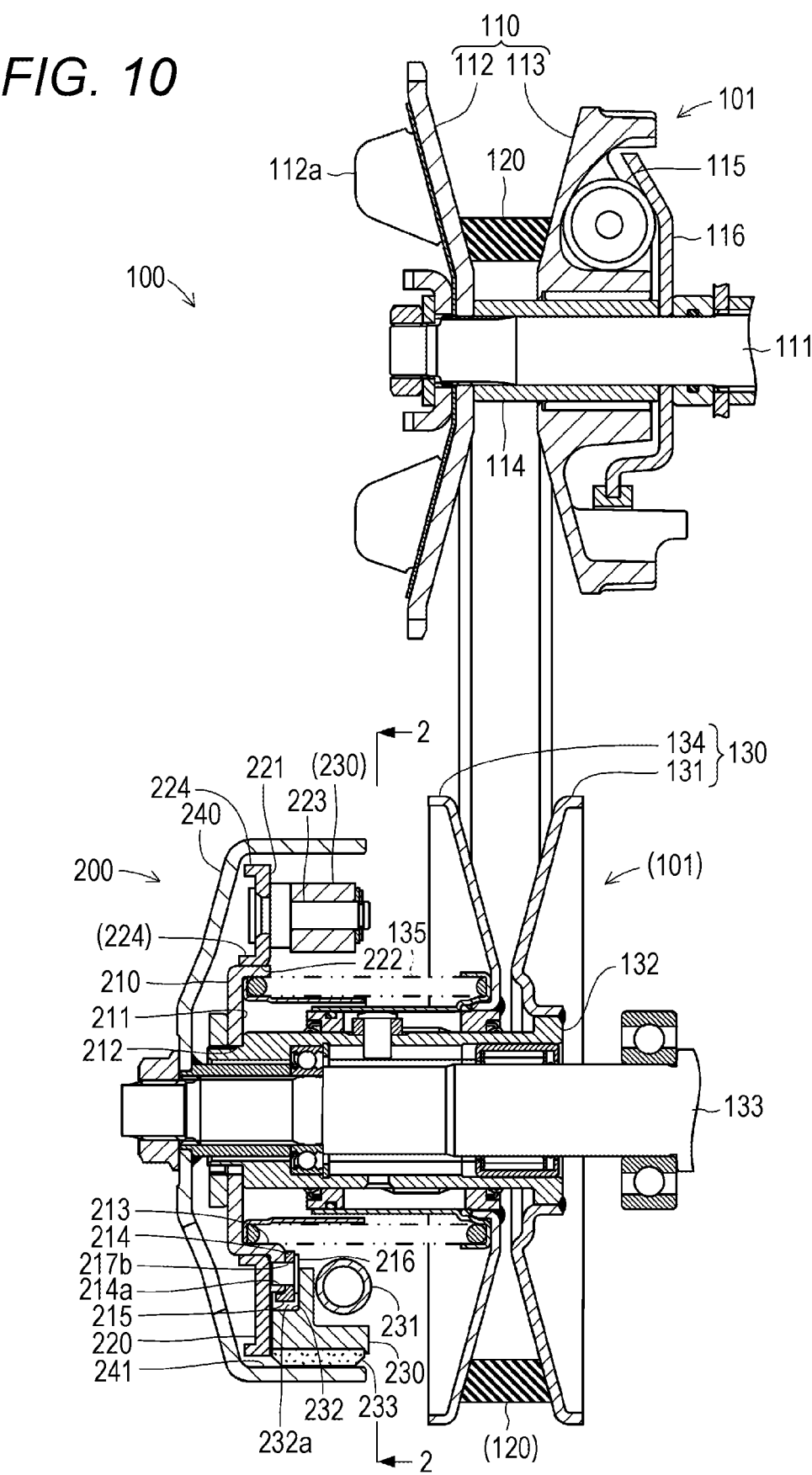
FIG. 10 is a plan sectional view schematically showing a configuration of a power transmission mechanism including the centrifugal clutch according to a modification of the present invention.
Figure 11:
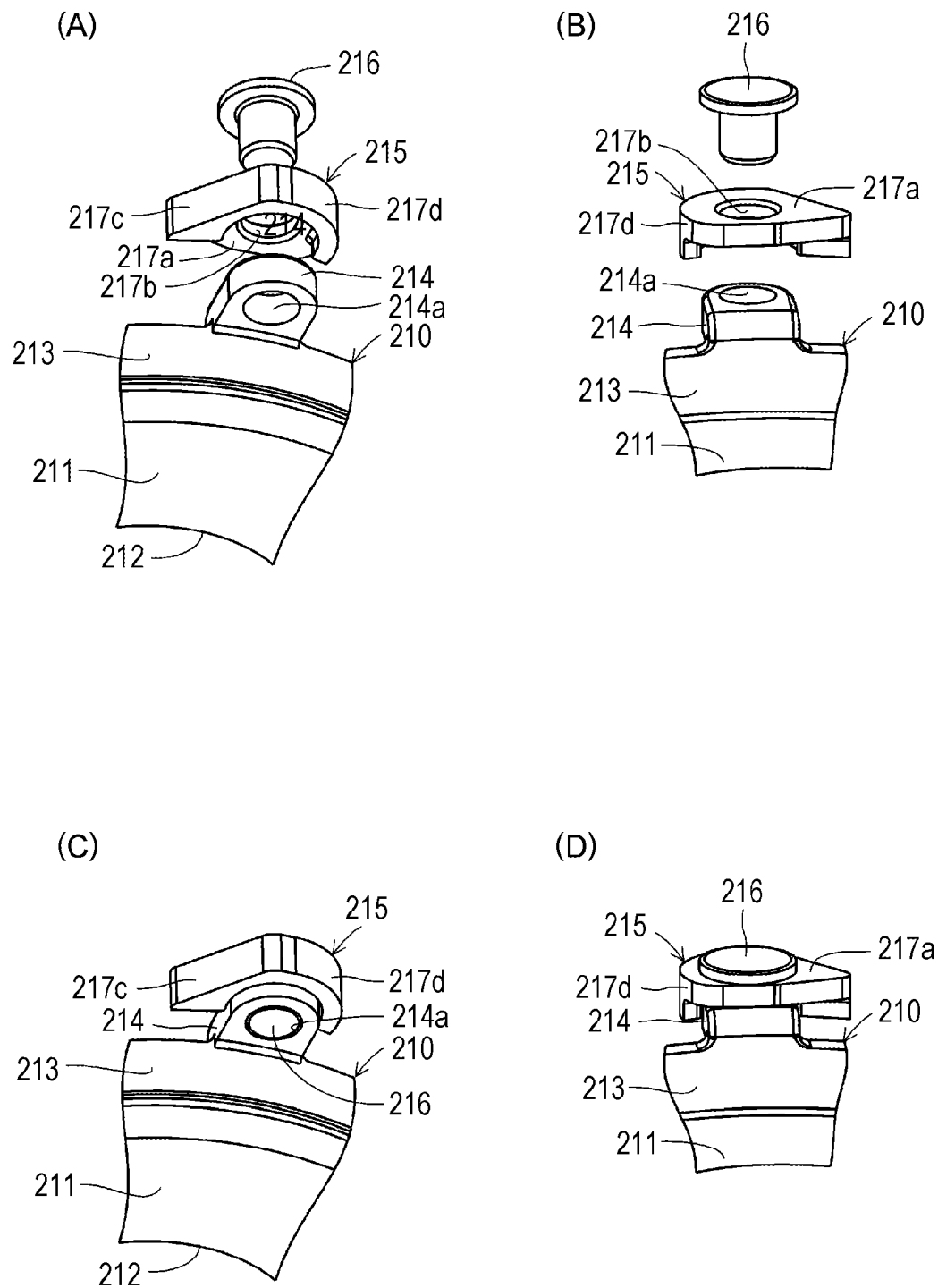

Further, in the above embodiment, the bulging body 215 is made of a roller. However, the bulging body 215 may be formed to bulge outwardly from an outer circumferential portion of the first drive plate 210, and may be formed in a shape such that the clutch weight 230 is pressed out outwardly via the pressing body 232a. That is, at least one of the bulging body 215 and the pressing body 232a may be formed to extend rearward in the rotational drive direction of the first drive plate 210 and outwardly to the first drive plate 210. In this case, in the bulging body 215 and the pressing body 232a, a portion extending rearward in the rotational drive direction of the first drive plate 210 and outwardly to the first drive plate 210 may be formed in the whole or a part of the bulging body 215 and the pressing body 232a. Therefore, for example, as shown in FIG. 10, the bulging body 215 can be formed of a plate-like metal material (for example, carbon steel and iron based sintered material).

More specifically, in the bulging body 215, as shown in FIGS. 11(A) to 11(D) and 12, a through-hole 217b through which the holding pin 216 passes through is formed in a central portion of a base portion 217a formed in a plate shape. Further, a bulging inclined surface 217c and a circular arc surface 217d are formed in a portion, which bulges in a direction perpendicular to the outer circumferential portion and is increased in thickness, of an outer circumferential portion of the base portion 217a. In this case, the through-hole 217b is formed to have an inner diameter slidable with respect to the holding pin 216, that is, a dimensional tolerance which is a so-called clearance fit with respect to the holding pin 216.

The bulging inclined surface 217c is a flat surface which allows the pressing body 232a of the clutch weight 230 to slide in a face contact state. The bulging inclined surface 217c is formed to obliquely extend rearward in the rotational drive direction of the first drive plate 210 and outwardly to the first drive plate 210. The circular arc surface 217d is formed to extend in a circular arc shape from a rear end of the bulging inclined surface 217c. The bulging inclined surface 217c and the circular arc surface 217d bulge beyond a plate thickness of the base portion 217a and are formed to be thick. This is for easily and accurately assembling the bulging body 215 to the supporting portion 214. Therefore, the bulging inclined surface 217c and the circular arc surface 217d can be formed to have the same thickness as the plate thickness of the base portion 217a.

The holding pin 216 passes through the bulging body 215 and the supporting portion 214. At this time, the bulging inclined surface 217c of the bulging body 215 is disposed on the supporting portion 214 in a direction of obliquely extending rearward in the rotational drive direction of the first drive plate 210 and outwardly to the first drive plate 210. In this case, the holding pin 216 may be inserted into the bulging body 215 from below the drawing in the same manner as in the above embodiment, or may be inserted from above the bulging body 215 in the drawing.

Figure 12:
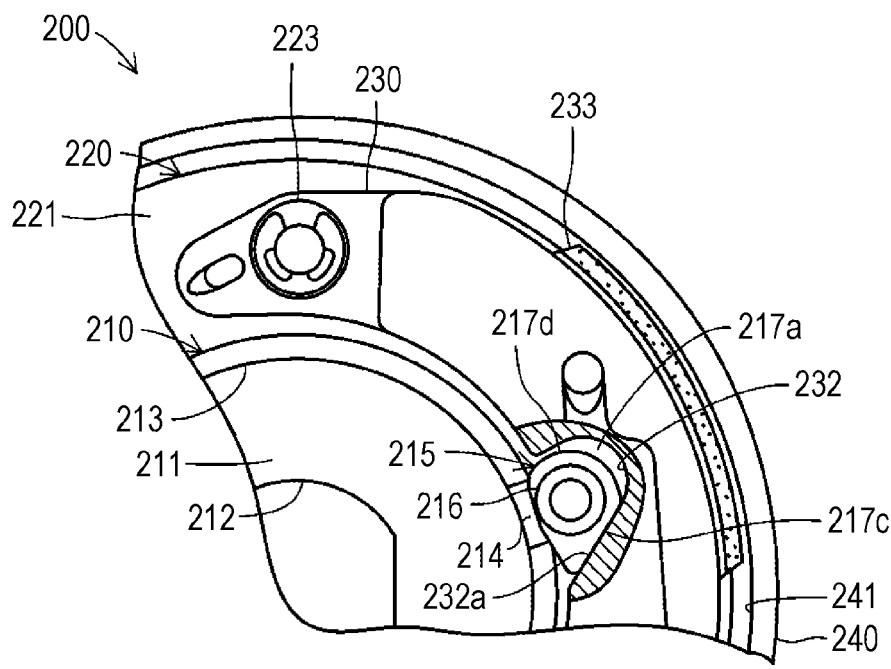
FIG. 12 is a partially enlarged view corresponding to FIG. 5 taken along a line 2-2 in FIG. 10, showing the bulging body and the pressing body in the centrifugal clutch in a disconnected state where the clutch shoes do not contact the clutch outer.
Figure 13:
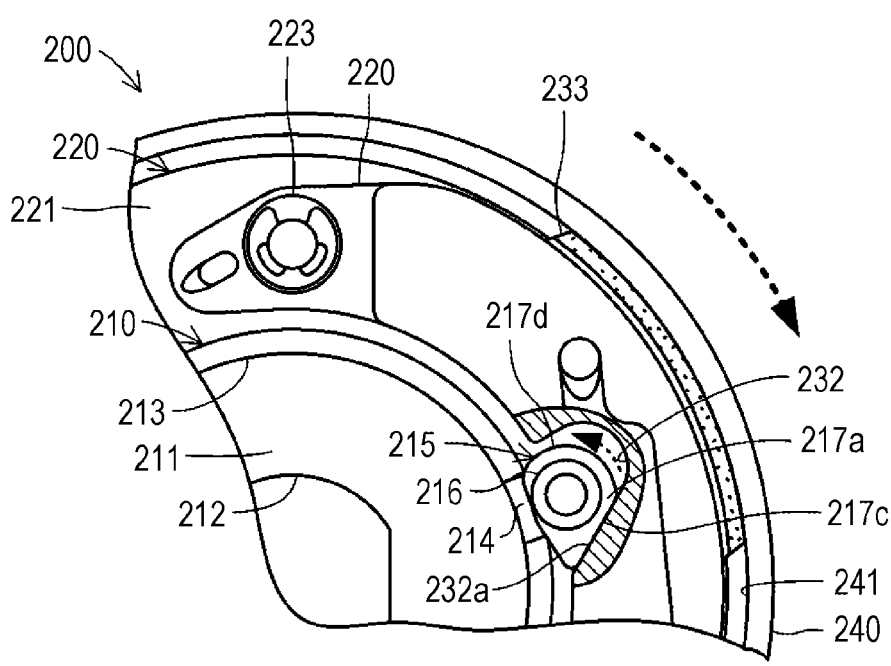
FIG. 13 is a partially enlarged view corresponding to FIG. 6 taken along the line 2-2 in FIG. 10, showing the contact state between the bulging body and the pressing body in the connected state in contact with the clutch outer in a state where the clutch shoe in the centrifugal clutch is not worn.

As shown in FIG. 13, in the centrifugal clutch 200 configured as described above, as the rotational speed of the engine increases, the clutch weight 230 is rotationally displaced toward the cylindrical surface 241 of the clutch outer 240 while resisting the elastic force (tensile force) of the connecting spring 231. As a result, the clutch shoe 233 contacts the cylindrical surface 241. In FIGS. 12 and 13, the connecting spring 231 is omitted in order to clarify the contact state between the bulging body 215 and the driven portion 232. In FIG. 13, the rotational drive direction of the first drive plate 210, the second drive plate 220, the clutch outer 240 and the bulging body 215 in the centrifugal clutch 200 is indicated by a dashed arrow.

When the clutch shoe 233 contacts the cylindrical surface 241, the clutch weight 230 receives a reaction force in a direction opposite to the rotational drive direction via the clutch shoe 233. Therefore, the second drive plate 220 is relatively displaced in the direction opposite to the rotational drive direction of the first drive plate 210 by the reaction force received by the clutch weight 230. Thus, the clutch weight 230 supported by the second drive plate 220 is relatively displaced in the direction opposite to the rotational drive direction of the first drive plate 210. Therefore, the pressing body 232a of the driven portion 232, which is in surface contact with the bulging inclined surface 217c of the bulging body 215, is displaced along the bulging inclined surface 217c.

In this case, the bulging inclined surface 217c of the bulging body 215 is formed to obliquely extend rearward in the rotational drive direction of the first drive plate 210 and outwardly to the first drive plate 210. Further, the pressing body 232a of the driven portion 232 is formed on the same plane as the bulging inclined surface 217c and is in surface contact with the bulging inclined surface 217c. Thus, as the pressing body 232a slides on the bulging inclined surface 217c, the clutch weight 230 is pressed toward the clutch outer 240 on the radially outer side, and the clutch shoe 233 is pressed against the cylindrical surface 241. As a result, after the clutch shoe 233 contacts the cylindrical surface 241 of the clutch outer 240, the clutch shoe 233 is pressed against the cylindrical surface 241 in an extremely short time (in other words, instantaneously). Thus, the centrifugal clutch 200 enters the connected state where the rotational driving force of the engine is completely transmitted to the drive shaft 133.

In the centrifugal clutch 200 in the connected state, since the state where the pressing body 232a of the driven portion 232 is pressed against the bulging inclined surface 217c of the bulging body 215 is maintained, the first drive plate 210 and the second drive plate 220 are rotationally driven together. Further, since the state where the clutch shoe 233 is pressed against the cylindrical surface 241 of the clutch outer 240 is maintained, the second drive plate 220 and the clutch outer 240 are rotationally driven together. Thus, the motorcycle vehicle can run since the rear wheel is rotationally driven by the rotational driving force of the engine.

On the other hand, when the rotational speed of the engine decreases, the centrifugal clutch 200 cuts off transmission of the rotational driving force of the engine to the drive shaft 133. Specifically, in centrifugal clutch 200, the centrifugal force acting on the clutch weight 230 is smaller than the elastic force (tensile force) of connecting spring 231 as the engine speed decreases. Thus, the clutch weight 230 is rotationally displaced radially inwardly around the fulcrum pin 223.

In this case, the pressing body 232a of the driven portion 232 of the clutch weight 230 slides on the bulging inclined surface 217c of the bulging body 215 by the elastic force (tensile force) of the connecting spring 231. Therefore, the second drive plate 220 is rotationally displaced forward in a rotation direction of the first drive plate 210 relatively with respect to the first drive plate 210. Thus, the second drive plate 220 returns to the original position (position in the idling state) with respect to the first drive plate 210. That is, the centrifugal clutch 200 enters the disconnected state, where the clutch shoes 233 are not in contact with the clutch outer 240 and the rotational driving force is not transmitted.

Further, in the above embodiment, the bulging body 215 is formed in a roller shape, and the pressing body 232a is formed in a planar shape. However, it is also possible to form the bulging body 215 into a flat shape, and to form the pressing body 232a in a rotatable roller shape or a curved surface shape fixedly provided in a non-rotatable manner.

Further, in the above embodiment, the second drive plate 220 is formed with the bent portion 224 bent at a right angle in each of the inner circumferential portion and the outer circumferential portion thereof. However, since the bent portion 224 is formed to increase the rigidity of the second drive plate 220, when the rigidity is secured by the material, thickness, or the like of the second drive plate 220, the bent portion 224 is not absolutely necessary and may be omitted. Further, the bent portion 224 may be provided on at least one of the inner circumferential portion and the outer circumferential portion of the second drive plate 220.

Further, in the centrifugal clutch 200 of the above embodiment, the pressing body 232a of the driven portion 232 is made of a material more easily worn than the bulging body 215, specifically, a zinc material. Thus, in the centrifugal clutch 200, since the pressing body 232a is made of a material more easily worn than the bulging body 215, the pressing body 232a is worn more than the bulging body 215. In this case, since the pressing body 232a is formed on the clutch weight 230 including the clutch shoe 233, it is renewed its replacing the clutch weight 230 due to wear of the clutch shoe 233. That is, in the centrifugal clutch 200, by exchanging the clutch weigh 230 due to wear of the clutch shoe 233, the pressing body 232a can also be replaced with a new one at the same time, so that maintenance burden can be reduced.

DESCRIPTION OF REFERENCE SIGNS

100: Power transmission mechanism, 101: Transmission,
110: Drive pulley, 111: Crankshaft, 112: Fixed drive plate, 112a: Radiating fin, 113: Movable drive plate, 114: Sleeve bearing, 115: Roller weight, 116: Ramp plate,
120: V-belt,
130: Driven pulley, 131: Fixed driven plate, 132: Driven sleeve, 133: Drive shaft, 134: Movable driven plate, 135: Torque spring,
200: Centrifugal clutch,
210: First drive plate, 211: Bottom portion, 212: Through-hole, 213: Cylinder portion, 214: Supporting portion, 214a: Through-hole, 215: Bulging body, 215a: Through-hole, 216: Holding pin, 217a: Base portion, 217b: Through-hole, 217c: Bulging inclined surface, 217d: Circular arc surface,
220: Second drive plate, 221: Ring plate, 222: Through-hole, 223: Fulcrum pin, 224: Bent portion,
230: Clutch weight, 231: Connecting spring, 232: Driven portion, 232a: Pressing body, 233: Clutch shoe,
240: Clutch outer, 241: Cylindrical surface

The invention claimed is:

1. A centrifugal clutch comprising:
a first drive plate rotationally driven together with a driven pulley by receiving a driving force of an engine;
a second drive plate disposed outside the first drive plate and contacting the first drive plate with a frictional force capable of being rotationally driven together with the first drive plate while allowing rotational displacement relative to the first drive plate;
a clutch weight movably mounted on the second drive plate, displaced outwardly to the second drive plate by a centrifugal force due to rotation drive of the second drive plate, and having a clutch shoe on a surface outside thereof;
a clutch outer having a cylindrical surface in frictional contact with the clutch shoe displaced outwardly to the second drive plate;
a bulging body formed to bulge outwardly from an outer circumferential portion of the first drive plate; and
a pressing body provided on the clutch weight and pressed against the bulging body, wherein
at least one of the bulging body and the pressing body is formed to extend rearwardly in a rotational drive direction of the first drive plate and outwardly to the first drive plate,
wherein the pressing body is constituted by a flat surface, and
the bulging body is constituted by a curved surface partially in contact with the pressing body,
wherein the bulging body is constituted by a roller rotatably provided rearward in the rotational drive direction of the first drive plate.

2. The centrifugal clutch according to claim 1, wherein at least one of an outer circumferential portion and an inner circumferential portion of the second drive plate has a bent portion bent with respect to a plate surface.

3. The centrifugal clutch according to claim 1, wherein the pressing body is constituted by a material more easily worn than the bulging body.

4. The centrifugal clutch according to claim 1, wherein at least one of two contact surfaces where the first drive plate and the second drive plate are in contact with each other is subjected to surface treatment to maintain slidability.

* * * * *